United States Patent
Barten

(10) Patent No.: US 7,992,784 B2
(45) Date of Patent: Aug. 9, 2011

(54) METHOD FOR READING SYMBOL INDICIA

(75) Inventor: Henri Jozef Maria Barten, Geldrop (NL)

(73) Assignee: Hand Held Products, Inc., Skaneateles Falls, NY (US)

( * ) Notice: Subject to any disclaimer, the term of this patent is extended or adjusted under 35 U.S.C. 154(b) by 223 days.

(21) Appl. No.: 11/582,868

(22) Filed: Oct. 18, 2006

(65) Prior Publication Data

US 2008/0093455 A1 Apr. 24, 2008

(51) Int. Cl.
*G06K 7/10* (2006.01)
(52) U.S. Cl. ..................... 235/454; 235/462.1
(58) Field of Classification Search .............. 235/472.01, 235/494, 455; 713/180; 380/37, 280; 382/100; 400/76
See application file for complete search history.

(56) References Cited

U.S. PATENT DOCUMENTS

| | | | |
|---|---|---|---|
| 7,308,477 B1 * | 12/2007 | Gress et al. ................. | 709/206 |
| 2003/0161475 A1 * | 8/2003 | Crumly et al. .............. | 380/280 |
| 2004/0128524 A1 * | 7/2004 | Ezaki ......................... | 713/189 |
| 2004/0199778 A1 * | 10/2004 | Wernet et al. ............... | 713/189 |
| 2004/0258274 A1 * | 12/2004 | Brundage et al. ........... | 382/100 |
| 2006/0095778 A1 * | 5/2006 | He et al. ..................... | 713/180 |
| 2007/0036599 A1 * | 2/2007 | Piersol et al. ................. | 400/76 |
| 2007/0050696 A1 * | 3/2007 | Piersol et al. ............... | 715/500 |
| 2007/0140481 A1 * | 6/2007 | Parameswaran Rajamma .................... | 380/37 |

* cited by examiner

*Primary Examiner* — Seung H Lee
*Assistant Examiner* — Sonji Johnson
(74) *Attorney, Agent, or Firm* — Hiscock & Barclay, LLP

(57) ABSTRACT

A method of reading indicia having encrypted data provided therein comprising the steps of: scanning indicia utilizing an indicia reader; recognizing the presence of encrypted data in the indicia; retrieving an appropriate encryption key for decrypting the encrypted data; decrypting the data utilizing the encryption key; and, decoding the decrypted data.

9 Claims, 4 Drawing Sheets

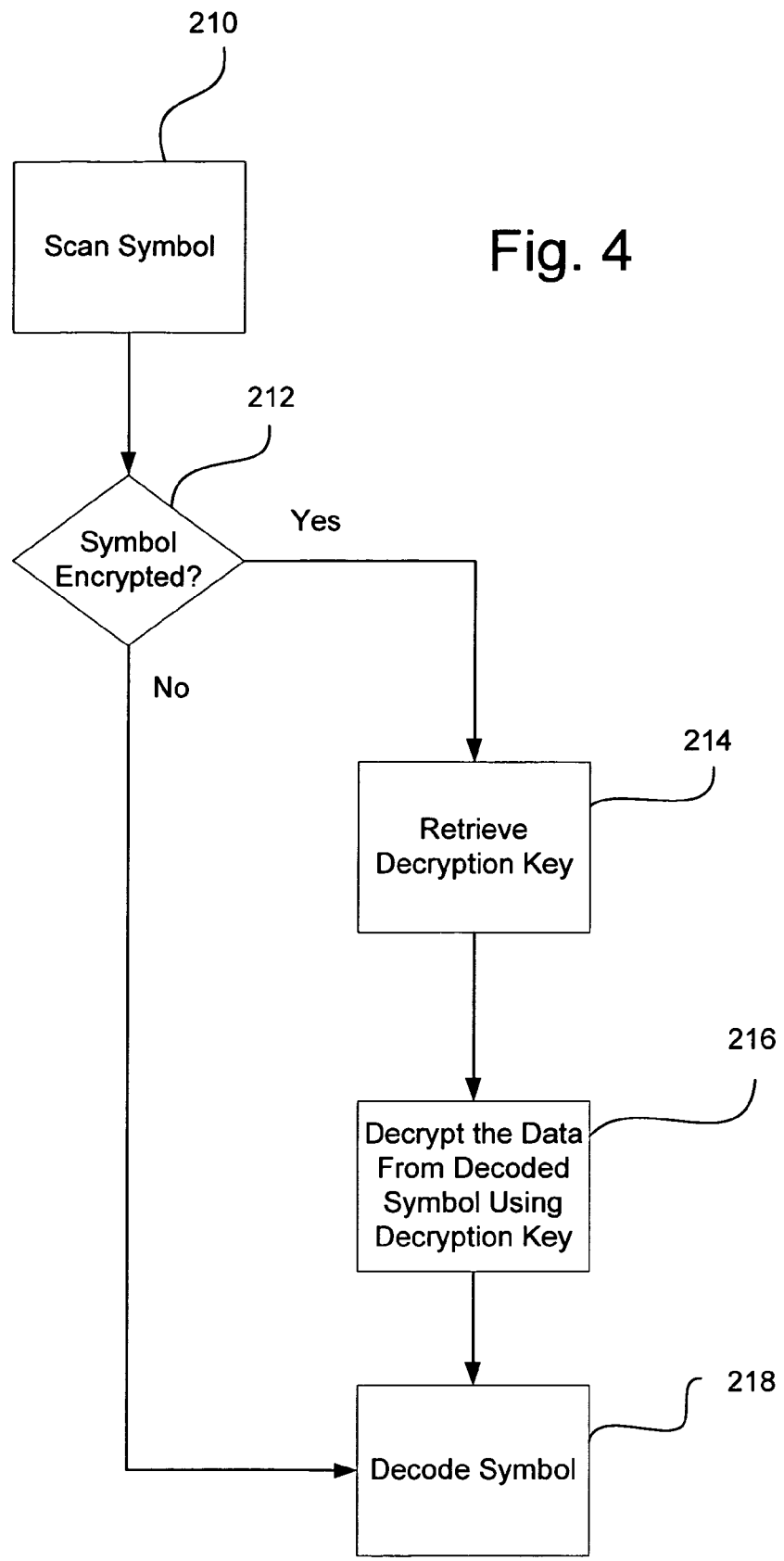

METHOD FOR READING SYMBOL INDICIA

FIELD OF THE INVENTION

The present invention relates to indicia reading devices, and more particularly to a method of updating indicia reading.

BACKGROUND

Indicia reading devices (also referred to as scanners, readers, etc.) typically read data represented by printed indicia, (also referred to as symbols, symbology, bar codes, etc.) Indicia reading devices may be configured to read or obtain information from an information bearing device, such as a card having a magnetic strip, symbol indicia such as a bar code, an RFID instrument, biogenic information such as a fingerprint, etc.

One type of a symbol indicia is an array of rectangular bars and spaces that are arranged in a specific way to represent elements of data in machine readable form. Optical indicia reading devices typically transmit light onto a symbol and receive light scattered and/or reflected back from a bar code symbol or indicia. The received light is interpreted by an image processor to extract the data represented by the symbol. Laser indicia reading devices typically utilize transmitted laser light.

One-dimensional (1D) optical bar code readers are characterized by reading data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures. Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a network computer.

Conventionally, a reader, whether portable or otherwise, may include a central processor which directly controls the operations of the various electrical components housed within the bar code reader. For example, the central processor controls detection of keyboard entries, display features, wireless communication functions, trigger detection, and bar code read and decode functionality.

Efforts regarding such systems have led to continuing developments to improve their versatility, practicality and efficiency.

BRIEF DESCRIPTION OF THE DRAWINGS

FIG. 4 is an exemplary flow chart for operating indicia reader system.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts. The term "scan" or "scanning" use herein refers to reading or extracting data from information bearing indicia.

An exemplary indicia reader system in accordance with the invention may be adapted for reading Indicia reading devices for numerous functions. A detailed description of indicia readers and their operation is disclosed in commonly owned published United States Patent Application Publication No. 20030029917 entitled OPTICAL READER FOR IMAGING MODULE and United States Patent Application Publication No. 20030019934 entitled OPTICAL READER AIMING ASSEMBLY COMPRISING APERTURE, United States Patent Application Publication No. 20040134989 entitled DECODER BOARD FOR AN OPTICAL READER UTILIZING A PLURALITY OF IMAGING FORMATS which are hereby incorporated herein by reference.

Figure 1:
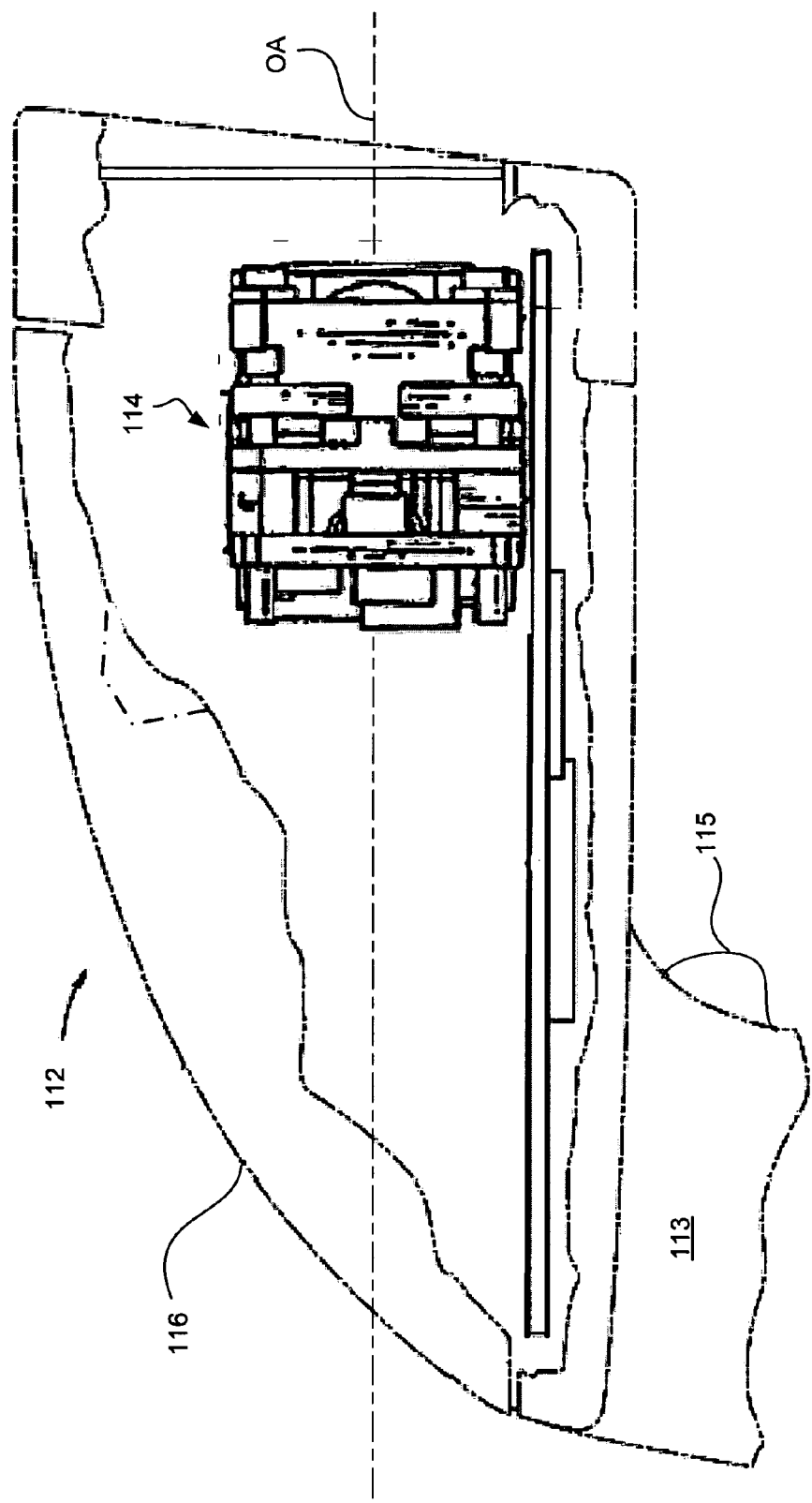
FIG. 1 is a fragmentary partially cutaway side view of an exemplary indicia reader in accordance with the present invention.
Figure 2:
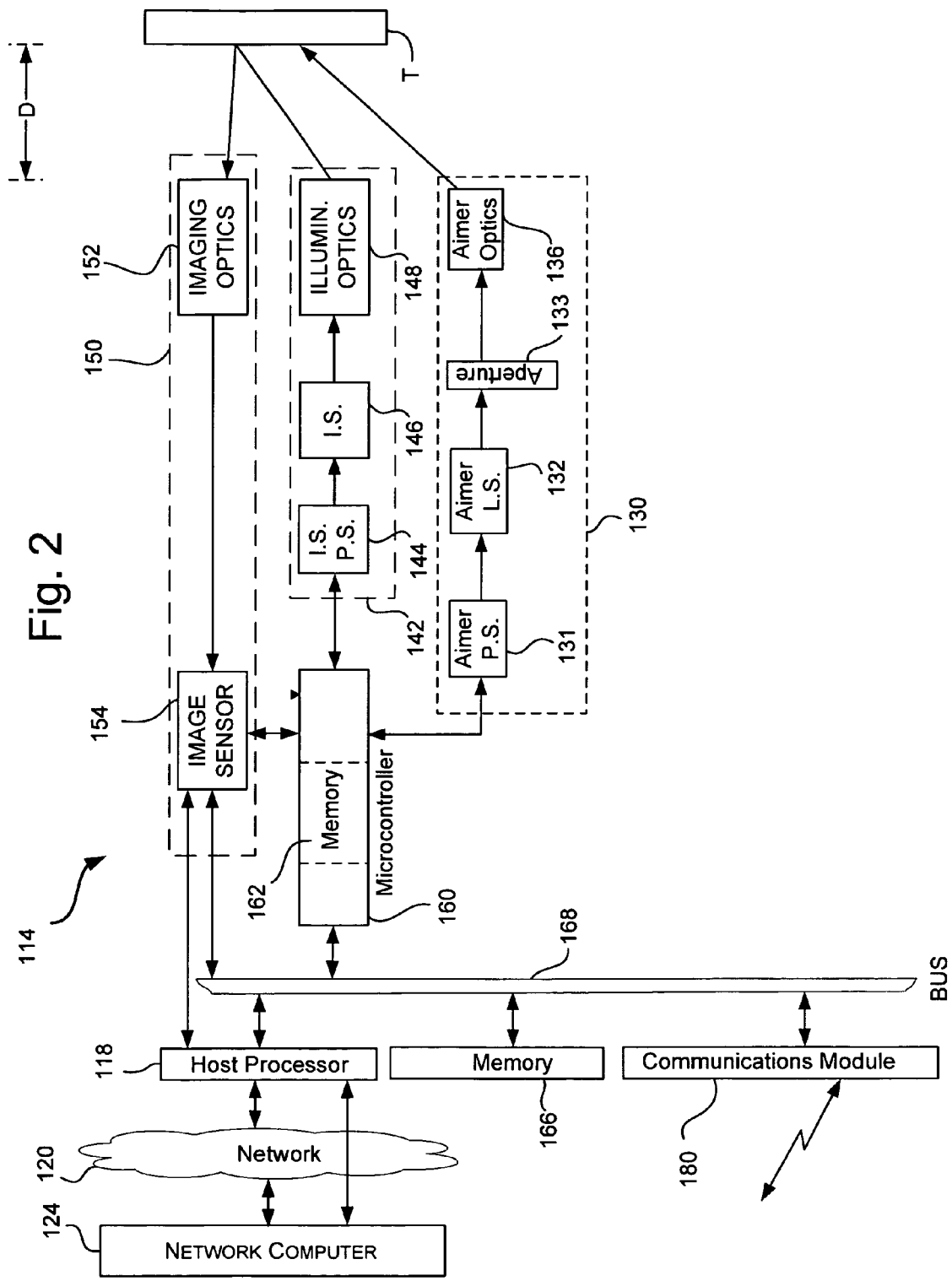
FIG. 2 is a block schematic diagram of an exemplary indicia reader in accordance with the present invention.

Referring to FIGS. 1 and 2, an optical indicia reader 112 may have a number of subsystems for capturing and reading images, some of which may have information bearing indicia provided therein. Reader 112 may have an imaging reader assembly 114 provided within a head portion or housing 116 which may be configured to be hand held by a handle portion 113. A trigger 115 may be used to control operation of the reader 112. The head portion 116 may have a medial plane MP selected so that the hand-held imager is held with the head portion generally in a horizontal plane. The medial plane MP will generally be perpendicular to the face of the scanning head 116. Generally operators have a tendency to hold the medial plane of the head portion of the imager approximately normal to the plane of the target when collecting data. Image reader assembly 114 has imaging receive optics 152 having an optical axis (OA) for receiving light reflected from a target T and directing or projecting the reflected light from the target T to an image sensor 154. The optical axis is a line of symmetry through the imaging optics.

The receive optics 152 has a focal point wherein parallel rays of light coming from infinity converge at the focal point. If the focal point is coincident with the image sensor, the target (at infinity) is "in focus". A target T is said to be in focus if light from target points are converged about as well as desirable at the image sensor. Conversely, it is out of focus if light is not well converged. "Focusing" is the procedure of adjusting the distance between the receive optics and the image sensor to cause the target T to be approximately in focus.

The target may be any information bearing device, such as an object or substrate bearing a 1D or 2D bar code symbol or text or other machine readable indicia. A trigger 115 may be used for controlling full or partial operation of the reader 112.

Image sensor 154 may be a two-dimensional array of pixels adapted to operate in a global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed. An exemplary CMOS sensor is model number MT9V022 from Micron Technology Inc. or model number VC5602V036 36CLCC from STMicroelectronics.

Further description of image sensor operation is provided in commonly owned U.S. patent application Ser. No. 11/077, 995 entitled "BAR CODE READING DEVICE WITH GLOBAL ELECTRONIC SHUTTER CONTROL" filed on Mar. 11, 2005, which is hereby incorporated herein by reference in it's entirety.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

Features and advantages associated with incorporating a color image sensor in an imaging device, and other control features which may be incorporated in a control circuit are discussed in greater detail in U.S. Pat. No. 6,832,725 entitled "An Optical Reader Having a Color Imager" incorporated herein by reference. It is to be noted that the image sensor 154 may read images with illumination from a source other than illumination source 146, such as by illumination from a source located remote from the reader.

The output of the image sensor may be processed utilizing one or more functions or algorithms to condition the signal appropriately for use in further processing downstream, including being digitized to provide a digitized image of target T.

Microcontroller 160, may perform a number of functions. The particulars of the functionality of microcontroller 160 may be determined by or based upon certain parameters which may be stored in memory or firmware. One such function may be controlling the amount of illumination provided by illumination source 146 by controlling the output power provided by illumination source power supply 144. Microcontroller 160 may also control other functions and devices.

An exemplary microcontroller 160 is a CY8C24223A made by Cypress Semiconductor Corporation, which is a mixed-signal array with on-chip controller devices designed to replace multiple traditional MCU-based system components with one single-chip programmable device. It may include configurable blocks of analog and digital logic, as well as programmable interconnects.

Microcontroller 160 may include a predetermined amount of memory 162 for storing firmware and data. The firmware may be a software program or set of instructions embedded in or programmed on the microcontroller which provides the necessary instructions for how the microcontroller operates and communicates with other hardware. The firmware may be stored in the flash ROM of the microcontroller as a binary image file and may be erased and rewritten. The firmware may be considered "semi-permanent" since it remains the same unless it is updated. This firmware update or load may be handled by a device driver.

The components in reader 112 may be connected by one or more bus 168 or data lines, such as an Inter-IC bus such as an $I^2C$ bus, which is a control bus that provides a communications link between integrated circuits in a system. This bus may connect to a host computer in relatively close proximity, on or off the same printed circuit board as used by the imaging device. $I^2C$ is a two-wire serial bus with a software-defined protocol and may be used to link such diverse components as the image sensor 154, temperature sensors, voltage level translators, EEPROMs, general-purpose I/O, A/D and D/A converters, CODECs, and microprocessors/microcontrollers.

The functional operation of the host processor 118 may involve the performance of a number of related steps, the particulars of which may be determined by or based upon certain parameters stored in memory 166 which may be any one of a number of memory types such as RAM, ROM, EEPROM, etc. In addition some memory functions may be stored in memory 162 provided as part of the microcontroller 160.

One of the functions of the host processor 118 may be to decode machine readable information bearing indicia provided within the target or captured image. One dimensional symbologies may include very large to ultra-small, Code 128, Interleaved 2 of 5, Codabar, Code 93, Code 11, Code 39, UPC, EAN, and MSI. Stacked 1D symbologies may include PDF, Code 16K and Code 49. 2D symbologies may include Aztec, Datamatrix, Maxicode, and QR-code. UPC/EAN bar codes are standardly used to mark retail products throughout North America, Europe and several other countries throughout the worlds. Decoding is a term used to describe the interpretation of a machine readable code contained in an image projected on the image sensor 154. The code has data or information encoded therein. Information respecting various reference decode algorithm is available from various published standards, such as by the International Standards Organization ("ISO").

Imaging reader assembly 114 may also have an aiming generator light source 132, aiming aperture 133, aiming optics 136, an illumination source(s) 146 and illumination optics 148.

Illumination and aiming light sources with different colors may be employed. For example, in one such embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget.

Aiming pattern generator 130 may include a power supply 131, light source 132, aperture 133 and optics 136 to create an aiming light pattern projected on or near the target which spans a portion of the receive optical system 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source may comprise any light source which is sufficiently small or concise and bright to provide a desired illumination pattern at the target. For example, light source 132 for aiming generator 130 may comprise one or more LEDs 134, such as part number NSPG300A made by Nichia Corporation.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an anamorphic lens with two different radii of curvature on their orthogonal lens axis. Alternately, the aimer pattern generator may be a laser pattern generator.

The light sources 132 may also be comprised of one or more laser diodes such as those available from Rohm. In this case a laser collimation lens (not shown in these drawings) will focus the laser light to a spot generally forward of the scanning hear and approximately at the plane of the target T. This beam may then be imaged through a diffractive interference pattern generating element, such as a holographic element fabricated with the desired pattern in mind. Examples of these types of elements are known, commercially available items and may be purchased, for example, from Digital Optics Corp. of Charlotte, N.C. among others. Elements of some of these types and methods for making them are also described in U.S. Pat. No. 4,895,790 (Swanson); U.S. Pat. No. 5,170,269 (Lin et al) and U.S. Pat. No. 5,202,775 (Feldman et al), which are hereby incorporated herein by reference.

Image reader may include an illumination assembly 142 for illuminating target area T. Illumination assembly 142 may also include one or more power supplies 144, illumination sources 146 and illumination optics 148.

A communications module 180 provides a communication link from imaging reader 114 to other imaging readers or to other systems such as host processor 118, memory 166, network 120, or network computer 124.

Figure 3:
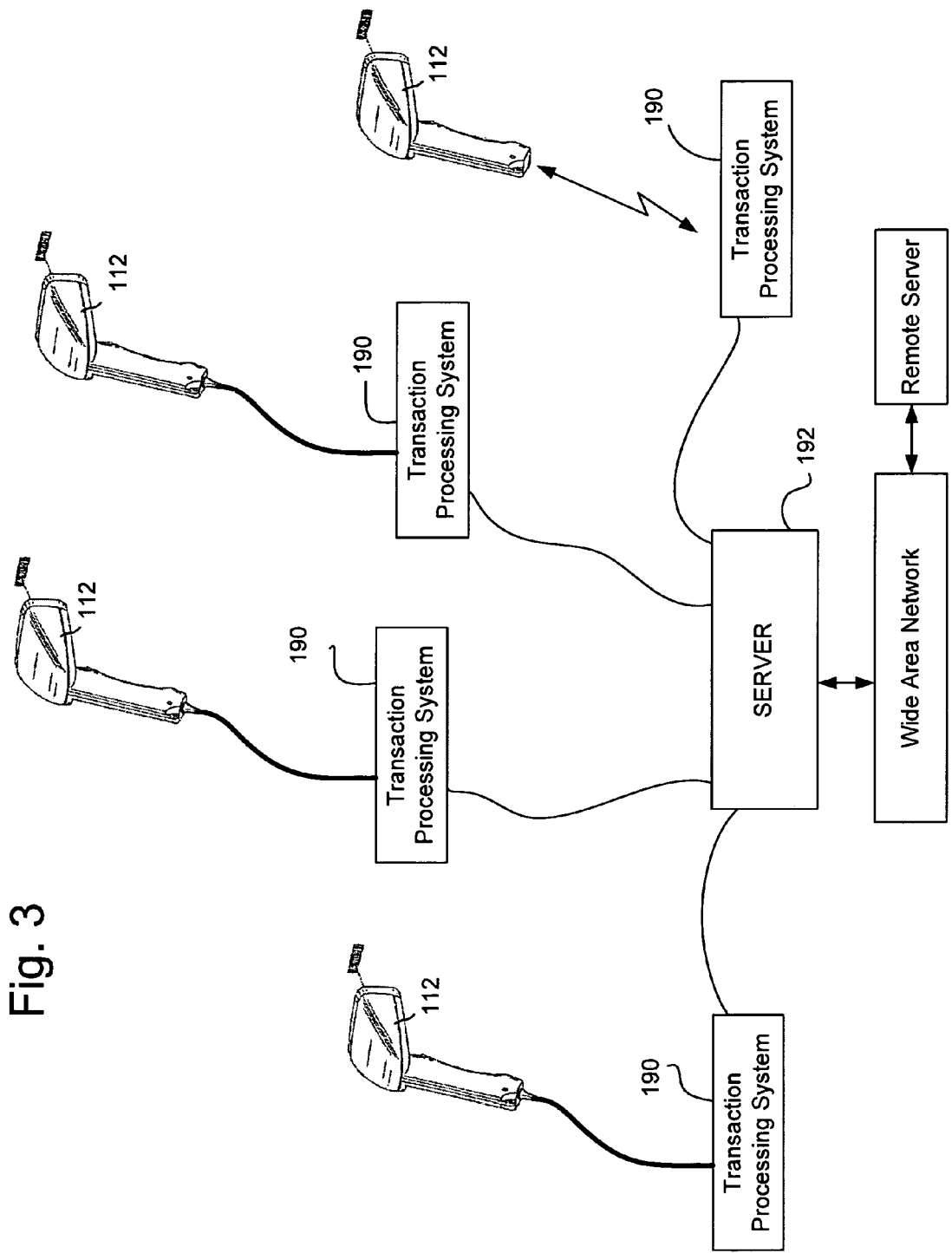
FIG. 3 is a block schematic diagram of an exemplary indicia reader system in accordance with the present invention.

FIG. 3 illustrates a scanning system configuration in accordance with the present invention, wherein a plurality of scanners 112 are being operated or utilized in a facility, such as a retail store. Each scanner may be in communication (wired or wireless) to a local transaction processing system 190, such as cash register. To execute a transaction, the operation of a cash register causes various communications of transaction data, such as a sales transaction amount, from the scanner 112 to the cash register 190 via a communications link, such as a universal serial bus (USB), an RS-232 serial communications cable, a wireless IEEE 802.11 communications channel or other channel. The transaction processing systems 190 may be in communication (wired or wireless) with a local server 192. The scanner 112 may communicates with the cash register 190 via the local network server 192 without employing the communications link. End users, such as retail stores may have many scanners located in an area of proximity. The local server 192 may be directly connected to a wide area network 194 to communicate with other remotely located servers 196. This type of arrangement can be scaled to include and support hundreds of scanners, cash registers, multiple local servers and remote servers.

Scanners may be outfitted with a communication module, such as a radio or transceiver configured to communicate with other scanners that have an appropriate type communication module. For example, applicable scanners may be equipped with Bluetooth® (Bluetooth Special Interest Group (SIG)) wireless technology for the communication.

Scanners may be equipped with the ability to automatically query and communicate data, such as firmware amongst each other via a communication link, such as by radio link. Upgrading firmware from scanner to scanner (also referred to as crossloading) and duplicating configuration parameters may be performed without human intervention to ensure scanners are operating at the same revision and have the same configuration parameters.

At predetermined time intervals each scanner may broadcast various information, such as its firmware revision, configuration parameters, etc. If a newer version of firmware or an updated configuration file is found on another scanner, the "old" scanner may request a copy from the "new" scanner. The old scanner may then download the newer files and update itself during a time of inactivity.

Information bearing devices may contain sensitive information such as component specifications, recipes or process data in a production environment, personal records, medical information in healthcare, social security numbers, biometrics, entrance and access keys, ticketing applications, vouchers for discount in retail or the information bearing devices may be involved in transactions involving financial or private information. In these type of applications the data is generally at risk from being misused and/or to perform criminal activity. A scanning system with security features may reduce such risks. For these applications it may be required that the data in an information bearing indicia be encrypted, wherein the information bearing indicia can be read, but the data in the information bearing indicia is encrypted. Encryption is the conversion of data into a form that cannot be easily understood by unauthorized people. A decrypting algorithm would be required to decrypt such data. Decryption is the process of converting encrypted data back into its original form, so it can be understood. Operation of the decrypting algorithm requires the use of a "key". Encryption key(s) may be secret keys, private keys, or public keys. This encryption key may be provided in the scanner firmware, the host device, in the encrypted barcode or in a separate barcode, which allows the user to decide whether to separate the encryption key from the data or combine them. Encryption keys may be associated by mathematical derivation, symmetry, or other relationship. Encryption keys may updated by pushing the key to the scanner from the host device, or by scanner to scanner communication as discussed hereinbefore.

For example, the scanner may be able to recognize the information bearing indicia as an encrypted information bearing indicia by recognizing a unique unencrypted piece of a data string provided within the information bearing indicia. That same piece of data may also instruct the scanner where to look for the encryption key.

The information bearing indicia may be partially encrypted, which may allow the user only to read an unencrypted part of the information bearing indicia with any scanner. A data formatter may be utilized to strip encrypted data portions before further processing. If the encryption key matches the encrypted information bearing indicia and decoding is completed, the scanner will successfully "read" the data in the information bearing indicia.

If a mismatch between encryption key and information bearing indicia is noticed the scanner may have a "encryption protected" routine with a different sequence of led blinking/beeps, different from an unsuccessful scanner read type situation.

Referring to FIG. 4, a method of reading a information bearing indicia having encrypted data provided therein may comprise the steps of: scanning indicia utilizing an indicia reader (210); recognizing the presence of encrypted data in the indicia (212); retrieving an appropriate encryption key for decrypting the encrypted data (214); decrypting the data utilizing the encryption key (216); and decoding the decrypted data (218). If there is no encrypted data in the indicia it is simply decoded.

The firmware program 232a attempts to authenticate the first digital signature using public encryption key 410u. If successful, the firmware program 232a attempts to authenticate the second digital signature using public encryption key 412u. If successful, the firmware program 232a tests for correctness of other information within the file header 272b. The private and public keys may be generated in accordance with encryption standards, such as Elliptic Curve Cryptosystem or RSA Cryptosystem.

It is to be noted that the reader of the present invention may be configured to read or obtain information from an information bearing device, such as a card having a magnetic strip, information bearing indicia such as a bar code, an RFID instrument, biogenic information such as a fingerprint, etc.

What is described herein is a method of reading indicia having encrypted data provided therein comprising the steps of: scanning indicia utilizing an indicia reader; recognizing the presence of encrypted data in the indicia; retrieving an appropriate encryption key for decrypting the encrypted data; decrypting the data utilizing the encryption key; and, decoding the decrypted data. The encryption key may be retrieved from firmware in the indicia reader, a host device, the indicia, another indicia. The scanner may be at a point of transaction and loaded with the key from a host device. The indicia may also have unencrypted data.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all exemplary embodiments that come within the scope and spirit of the following claims and equivalents thereto are claimed as the invention.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. A method of reading indicia having encrypted data provided therein comprising the steps of:
    scanning a first indicia utilizing an indicia reader;
    recognizing the presence of encrypted data in the first indicia;
    retrieving an encryption key for decrypting the encrypted data;
    decrypting the data utilizing the encryption key;
    decoding the decrypted data;
    detecting that there is a mismatch between the encryption key and the encrypted data; and,
    after the step of detecting that there is a mismatch, providing an indication on the indicia reader that the indicia has not been read due solely to the mismatch between the encryption key and the encrypted data.

2. A method of reading indicia in accordance with claim 1, wherein the encryption key is retrieved from the first indicia.

3. A method of reading indicia in accordance with claim 1, wherein the encryption key is retrieved from a second indicia.

4. A method of reading indicia in accordance with claim 1, wherein the scanning is performed at a point of transaction.

5. A method of reading indicia in accordance with claim 1, wherein the first indicia also provides unencrypted data.

6. A method of reading indicia in accordance with claim 1, wherein the step of retrieving the encryption key for decrypting the encrypted data includes retrieving the encryption key from a data storage device identified in the first indicia or in a second indicia.

7. A method of reading indicia in accordance with claim 1, wherein the encryption key is retrieved from firmware in the indicia reader.

8. A method of reading indicia in accordance with claim 1, wherein the encryption key is retrieved from a host device in communication with the indicia reader.

9. A method of reading indicia in accordance with claim 1, further comprising the step of loading an encryption key into the indicia reader.

* * * * *